United States Patent
Koyama

(10) Patent No.: US 9,875,525 B2
(45) Date of Patent: Jan. 23, 2018

(54) IMAGE PROCESSING DEVICE, PROJECTOR, AND IMAGE PROCESSING METHOD

(71) Applicant: SEIKO EPSON CORPORATION, Tokyo (JP)

(72) Inventor: Takaaki Koyama, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 59 days.

(21) Appl. No.: 14/218,108

(22) Filed: Mar. 18, 2014

(65) Prior Publication Data
US 2014/0285524 A1   Sep. 25, 2014

(30) Foreign Application Priority Data
Mar. 25, 2013   (JP) .................. 2013-061568

(51) Int. Cl.
*G06T 3/60* (2006.01)
*G06F 3/042* (2006.01)
*G06F 3/0354* (2013.01)

(52) U.S. Cl.
CPC ............ *G06T 3/60* (2013.01); *G06F 3/03542* (2013.01); *G06F 3/0425* (2013.01)

(58) Field of Classification Search
CPC ..................................................... G06T 3/60
See application file for complete search history.

(56) References Cited

U.S. PATENT DOCUMENTS

| | | | | |
|---|---|---|---|---|
| 2006/0059514 A1* | 3/2006 | Hsiao | ................ | H04N 5/44513 725/42 |
| 2007/0032720 A1* | 2/2007 | Koivukangas | ....... | A61B 5/7475 600/407 |
| 2009/0085935 A1* | 4/2009 | Yamashita | ............ | G06F 3/0325 345/660 |
| 2010/0020322 A1* | 1/2010 | De Vries | ............... | B26B 19/382 356/338 |
| 2011/0169746 A1 | 7/2011 | Kitajima | | |
| 2012/0044140 A1* | 2/2012 | Koyama | ............... | G06F 3/0325 345/157 |
| 2012/0056878 A1* | 3/2012 | Miyazawa | ............ | G06F 1/1626 345/419 |
| 2012/0212415 A1 | 8/2012 | Yokobayashi | | |
| 2012/0229384 A1* | 9/2012 | Nakane | ............... | G06F 3/03545 345/158 |
| 2014/0104163 A1* | 4/2014 | Ide | ........................ | G06F 3/0425 345/156 |
| 2014/0253466 A1* | 9/2014 | Brewer | ............... | G06F 3/03545 345/173 |

FOREIGN PATENT DOCUMENTS

JP   2009-064109 A   3/2009
JP   A-2012-173447   9/2012

* cited by examiner

*Primary Examiner* — Kee M Tung
*Assistant Examiner* — Grace Q Li
(74) *Attorney, Agent, or Firm* — Oliff PLC

(57) ABSTRACT

An image processing device includes a detection section adapted to detect a pointing direction of a pointing body, and a rotation section adapted to rotate an image based on the pointing direction detected by the detection section.

12 Claims, 7 Drawing Sheets

IMAGE PROCESSING DEVICE, PROJECTOR, AND IMAGE PROCESSING METHOD

The entire disclosure of Japanese Patent Application No. 2013-061568, filed Mar. 25, 2013 is expressly incorporated by reference herein.

BACKGROUND

1. Technical Field

The present invention relates to an image processing device, a projector, and an image processing method.

2. Related Art

There has been known an interactive system provided with a projector for projecting an image, and a light emitting pen operated by the user on the image projected (see, e.g., JP-A-2012-173447). The light emitting pen is a pointing body for emitting an infrared ray from the pen tip, and the projector detects the infrared ray from the light emitting pen to recognize the operation content of the user.

When the projector projects a projection image on a horizontal projection surface such as a desk, the user performs the operation in a variety of positions in the periphery of the desk in some cases. However, in the interactive system according to related art, since the direction of the projection image projected by the projector is fixed to a predetermined direction, there has been a disadvantage that the projection image is difficult to be viewed by the user depending on the position where the operation is performed. As described above, there is a problem that the convenience of the user is insufficient when operating the projection image.

SUMMARY

An advantage of some aspects of the invention is to provide an image processing device, a projector, and an image processing method each capable of enhancing the convenience of the user in operating the projection image.

(1) An aspect of the invention is directed to an image processing device including a detection section adapted to detect a pointing direction of a pointing body, and a rotation section adapted to rotate an image based on the pointing direction detected by the detection section.

According to this configuration, the image processing device can rotate the image to change the direction to the direction easy for the user to operate the image by detecting the pointing direction of the pointing body, and can therefore enhance the convenience of the user in operating the projection image.

(2) Another aspect of the invention is directed to the image processing device described above, wherein the image processing device further includes a scale change section adapted to change a scale size of the image when the rotation section rotates the image.

According to this configuration, the image processing device can change the scale size of the image when rotating the direction of the image, and can therefore rotate the image without causing a deflection in the image or an object in the image.

(3) Still another aspect of the invention is directed to the image processing device described above, wherein the image processing device further includes a position shift section adapted to shift a position of the image when the rotation section rotates the image.

According to this configuration, the image processing device can shift the position where the image is projected when rotating the image, and can therefore project the image at the position easy for the user to perform the operation.

(4) Yet another aspect of the invention is directed to the image processing device described above, wherein the image processing device further includes a position analysis section adapted to analyze a position pointed by the pointing body, and the rotation section rotates a partial area of the image based on the pointing direction of the pointing body detected by the detection section and the position pointed by the pointing body analyzed by the position analysis section.

According to this configuration, it is possible for the image processing device to rotate the partial area, for example, a window alone in the image in accordance with the pointing direction of the pointing body and the position of the pointing body.

(5) Still yet another aspect of the invention is directed to the image processing device described above, wherein the detection section detects the pointing direction based on a distribution of an intensity of light emitted by the pointing body.

According to this configuration, it is possible for the image processing device to detect the pointing direction of the pointing body based on the intensity distribution of the light emitted by the pointing body.

(6) Further another aspect of the invention is directed to the image processing device described above, wherein the detection section further includes a tilt detection section adapted to detect a tilt of the pointing body, and the detection section detects the pointing direction based on the tilt of the pointing body detected by the tilt detection section.

According to this configuration, it is possible for the image processing device to detect the pointing direction of the pointing body based on the tilt of the pointing body.

(7) Still further another aspect of the invention is directed to the image processing device described above, wherein the rotation section outputs an instruction signal of rotating the image to an external device to make the external device rotate the image.

According to this configuration, the image processing device can make the external device rotate the output image to change the direction to the direction easy for the user to operate the image by detecting the direction of the pointing body, and can therefore enhance the convenience of the user in operating the projection image.

(8) Yet further another aspect of the invention is directed to a projector including an input section adapted to receive an input image, a projection section adapted to project the input image received by the input section, a detection section adapted to detect a pointing direction of a pointing body, and a rotation section adapted to rotate the input image based on the pointing direction detected by the detection section, and then make the projection section project the input image rotated.

According to this configuration, the projector can rotate the image to change the direction to the direction easy for the user to operate the image by detecting the pointing direction of the pointing body, and can therefore enhance the convenience of the user in operating the projection image.

(9) Still yet further another aspect of the invention is directed to an image processing method including detecting a pointing direction of a pointing body, and rotating an image based on the pointing direction of the pointing body detected in the detecting.

According to this configuration, the image processing method can rotate the image to change the direction to the direction easy for the user to operate the image by detecting the pointing direction of the pointing body, and can therefore enhance the convenience of the user in operating the projection image.

According to the aspects of the invention, the convenience of the user in operating the projection image can be enhanced.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, a first embodiment of the invention will be explained in detail with reference to the accompanying drawings.

Figure 1:
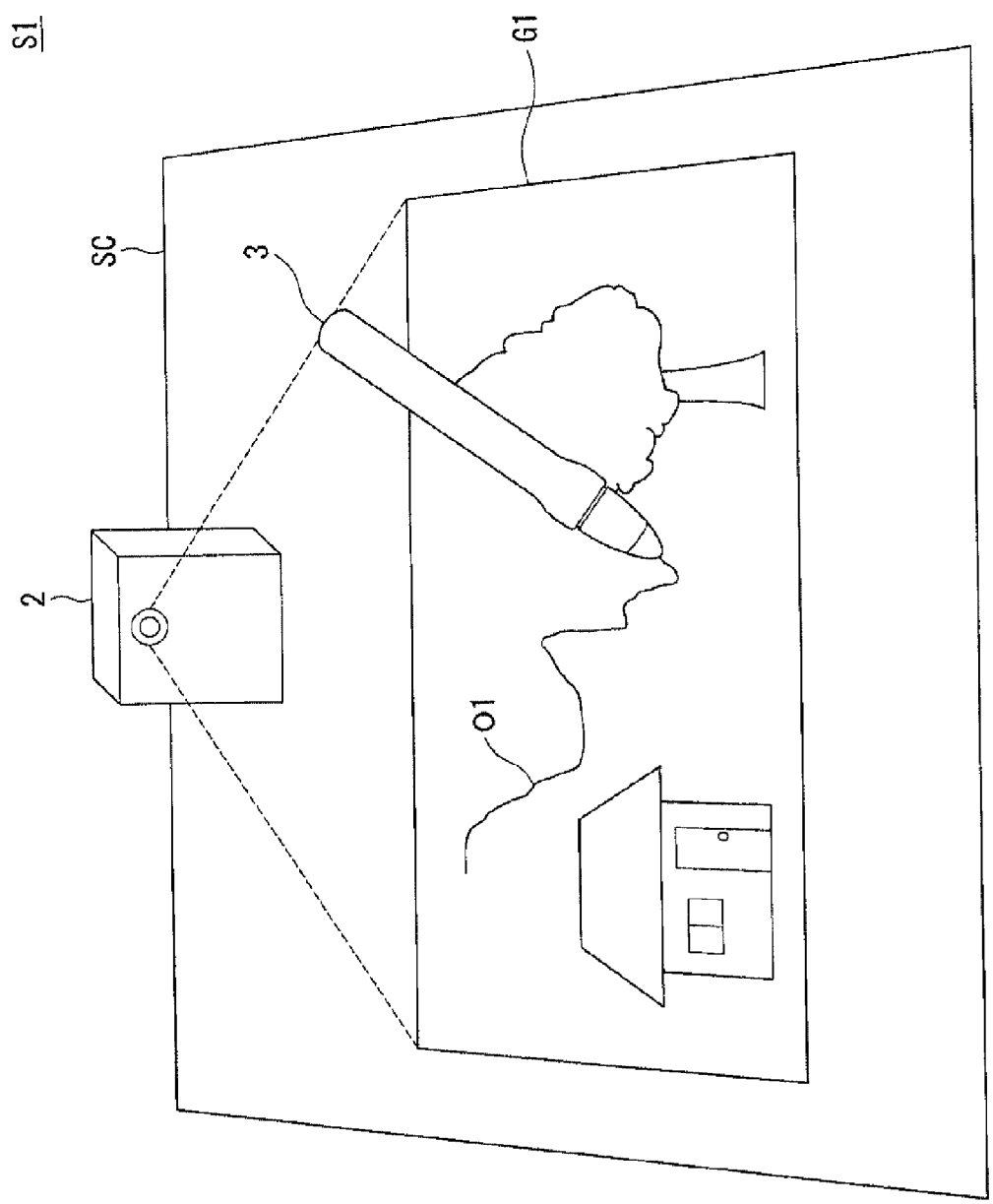
FIG. 1 is a schematic diagram showing an example of a configuration of an interactive system according to a first embodiment of the invention.

FIG. 1 is a schematic diagram showing an example of a configuration of an interactive system S1 according to the first embodiment of the invention.

The interactive system S1 is configured including a projector 2 provided with an image processing device 1, and a light emitting pen 3 as a pointing body.

The projector 2 projects an image G1 on a projection surface SC. The user is allowed to point a part of the image G1 (hereinafter referred to as a projection image) projected, and draw an object O1 such as a figure or a character on the image G1 using the light emitting pen 3. On this occasion, the light emitting pen 3 makes a light emitting element provided to the tip of the light emitting pen 3 emit light to thereby irradiate the projector 2 with an infrared ray, and the projector 2 detects the light emitted by the light emitting pen 3 to recognize the position of the light emitting pen 3.

Thus, the projector 2 generates an image corresponding to the operation of the light emitting pen 3 as an operation image, and then projects a new projection image G1 overlapping the operation image thus generated on the projection surface SC.

It should be noted that in the description of the present embodiment, the projection surface SC on which the projector 2 projects the projection image G1 is assumed to be a horizontal surface such as a desk. Further, the projector 2 is preferably installed so as to project an image from above or obliquely above the projection surface SC.

Figure 2:
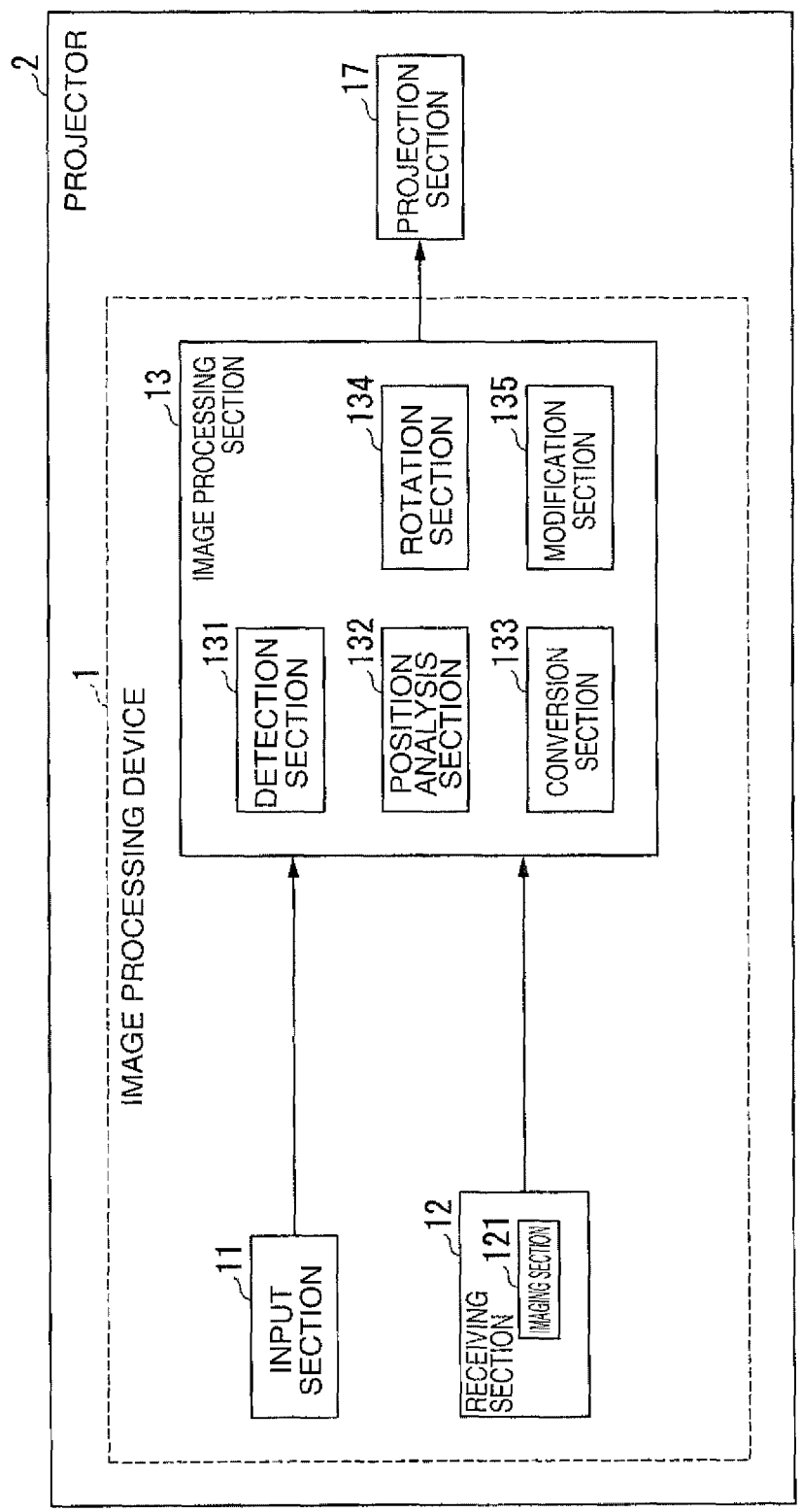
FIG. 2 is a schematic block diagram showing an example of a configuration of a projector provided with an image processing device according to the embodiment.

FIG. 2 is a schematic block diagram showing an example of a configuration of the projector 2 provided with the image processing device 1 according to the present embodiment.

The projector 2 is configured including the image processing device 1 and a projection section 17. The image processing device 1 is configured including an input section 11, a receiving section 12, and an image processing section 13. The receiving section 12 is configured including an imaging section 121. The image processing section 13 is configured including a detection section 131, a position analysis section 132, a conversion section 133, a rotation section 134, and a modification section 135. Although the projector 2 is provided with functions of a typical projector in addition to the above, such functions will be omitted from the drawings and the explanation.

The input section 11 receives an input image from an external device (e.g., a personal computer). The input section 11 outputs the input image thus received to the image processing section 13.

The receiving section 12 receives the infrared ray emitted by the light emitting pen 3 using the imaging section 121.

The imaging section 121 images the infrared ray, which has been emitted by the light emitting pen 3, on an imaging element. Specifically, the imaging section 121 is provided with the imaging element (not shown) such as a charge coupled device (CCD) sensor or a complementary metal oxide semiconductor (CMOS) sensor, and an imaging lens (not shown). The imaging section 121 is disposed in the vicinity of a projection lens (not shown) of the projector 2, and shoots a range of the projection surface SC including the projection image at a predetermined frame rate. The imaging section 121 generates image information representing the image (hereinafter referred to as a shot image) thus shot, and then outputs the image information thus generated to the image processing section 13. It should be noted that the light imaged by the imaging section 121 is light in a wavelength range of, for example, 940 nm.

The image processing section 13 is provided with a central processing device (CPU), a random access memory (RAM) used for, for example, temporarily storing a variety of data, a nonvolatile memory such as a mask read only memory (ROM), a flash memory, or a ferroelectric random access memory (FeRAM), and a processing device for image analysis (anyone not shown).

The image processing section 13 performs image processing described later on the input image, and then outputs an output signal representing the image (an output image) after the processing to the projection section 17.

The detection section 131 detects the direction of the light emitting pen 3 based on the image information input from the imaging section 121. Specifically, the detection section 131 detects the direction of the light emitting pen 3 based on a light intensity distribution included in the shot image obtained by shooting the light emitting pen 3 emitting the light. In a more specific explanation, the detection section 131 firstly detects a position with the highest light intensity of the shot image as a reference light point. Subsequently, the detection section 131 detects a plurality of positions having a predetermined light intensity lower than the intensity of the reference light point as candidate light points. The detection section 131 calculates the distance between the reference light point and each of the candidate light points. The detection section 131 detects the candidate light point located to have the longest distance from the reference light point as an extracted light point. The detection section 131 detects the direction from the reference light point toward the extracted light point as a direction (a pointing direction) of the light emitting pen 3.

Here, the light emitting pen 3 emits the infrared ray from the tip portion of the light emitting pen 3 in a direction parallel to the axis (an axis passing through the tip portion and the other end portion of the light emitting pen 3) and proceeding from the other end portion toward the tip portion. Therefore, the pointing direction of the light emitting pen 3 detected by the detection section 131 denotes a direction obtained by projecting the direction from the other end portion to the tip portion of the light emitting pen 3 on the projection surface SC. It should be noted that based on the direction of the light emitting pen 3, the detection section 131 can also detect a direction from the projection image toward the user in the case in which the user operates the projection image using the light emitting pen 3.

The position analysis section 132 is configured including a processing device for image analysis, a memory, and so on (anyone not shown). The position analysis section 132 analyzes the image information input from the imaging section 121 to identify the position (the light emitting position) where the light emitting pen 3 emits light. The position analysis section 132 outputs the position information representing the light emitting position thus identified to the conversion section 133.

The conversion section 133 stores a conversion table based on the correspondence relationship between the coordinate in the shot image shot by the imaging section 121 and the coordinate in the projection image projected by the projection section 17. The conversion section 133 converts the positional coordinate of the light emitting pen 3 input from the position analysis section 132 into the positional coordinate in the projection image based on the conversion table. Here, the correspondence relationship between the coordinate in the shot image and the coordinate in the projection image is obtained by the calibration performed in advance, and is then stored as the conversion table. It should be noted that the image processing section 13 performs the process of overlapping a predetermined mark or the like at the position based on the positional coordinate thus converted to reflect it in the projection image.

The rotation section 134 rotates the input image received by the input section 11 based on the direction of the light emitting pen 3 detected by the detection section 131. Specifically, the rotation section 134 rotates the input image so that the pointing direction of the light emitting pen 3 detected by the detection section 131, namely the direction from the user toward the projection image in the case in which the user attempts to operate the projection image with the light emitting pen 3, and the direction from the bottom toward the top of the projection image coincide with each other. Here, "coinciding with each other" includes not only the case in which the directions completely coincide with each other, but the case in which the direction from the user toward the projection image in the case in which the user attempts to operate the projection image with the light emitting pen 3 and the direction from the bottom toward the top of the projection image are roughly the same directions.

A scale change device of the modification section 135 changes the scale size of the rotated image, and the position where the rotated image is displayed in an area (hereinafter referred to as a projection performable area) of the projection surface SC in which the projection section 17 can project the projection image. Specifically, the scale change device of the modification section 135 changes the scale size of the image so that the whole of the image is displayed in the projection performable area without changing the aspect ratio of the rotated image from the aspect ratio of the image to be rotated. For example, in the case of rotating a landscape image having been displayed in the entire projection performable area 90 degrees, the scale change device of the modification section 135 shrinks the image so that the long side of the rotated image has the same length as that of the short side of the image to be rotated. Further, in the case of further rotating the image 90 degrees, the scale change device of the modification section 135 enlarges the image so that the short side of the rotated image has the same length as that of the long side of the image to be rotated.

As described above, in the case of rotating the image having been displayed in the entire projection performable area by 90 degrees, the scale change device of the modification section 135 changes the scale size so that a predetermined one of the sides in the rotated image coincides with the other one of the sides of the image to be rotated.

Further, in some cases, a position shift device of the modification section 135 changes the position of the image so that the center of the rotated image becomes a different position from the center of the image to be rotated in the case in which the rotated image is smaller than the projection performable area. Specifically, the position shift device of the modification section 135 moves the image in an opposite direction to the pointing direction detected by the detection section 131 within the range in which the entire image is displayed in the projection performable area. In other words, the position shift device of the modification section 135 moves the projection image closer to the user who performs an operation using the light emitting pen 3. For example, in the case of displaying a landscape image in the entire projection performable area, if the user performs an operation from the right side of the image using the light emitting pen 3, the modification section 135 shrinks the image, which is rotated 90 degrees counterclockwise by the rotation section 134, and at the same time, moves the image so that the lower side of the rotated image coincides with the right side of the image to be rotated.

Thus, the image processing device 1 can rotate the image while keeping the aspect ratio to make it possible to prevent the image from being partially lost due to the rotation of the image. Further, the image processing device 1 rotates the image while keeping the aspect ratio to thereby make it possible to prevent the object drawn by the user and the image from being distorted. Further, when rotating the image, the image processing device 1 can display the image at a position easy for the user to operate the image.

The projection section 17 is provided with a discharge lamp, a liquid crystal panel, a spectroscopic element, a polarization element, a projection lens, and so on (anyone not shown), and projects the projection image on the projection surface SC based on the output signal input from the image processing section 13.

Figure 3:
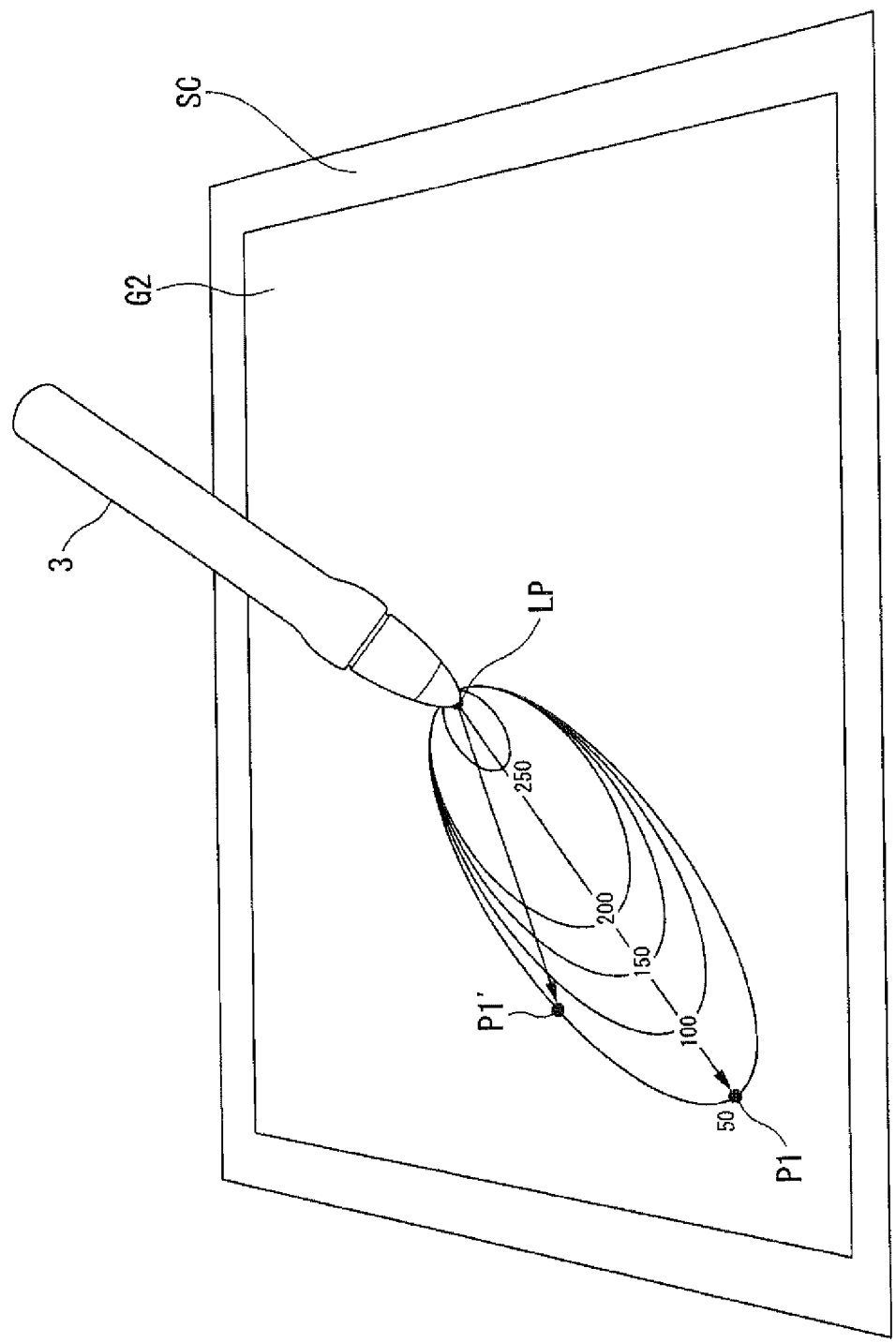
FIG. 3 is an explanatory diagram for explaining an example of a direction detection process of a pointing body of a detection section of the image processing section according to the embodiment.

FIG. 3 is an explanatory diagram for explaining an example of a direction detecting process of a pointing body (the light emitting pen 3) of the detection section 131 of the image processing section 13 according to the present embodiment.

The projector 2 projects a projection image G2 on the projection surface SC. The light emitting pen 3 is operated on the projection image G2. When the light emitting pen 3 emits the light at a certain position on the projection image G2, the intensity of the light has a distribution shown in the drawing. In other words, the intensity of the light decreases as the distance from the position LP, at which the intensity of the light is the highest, increases. However, in the direction in which the light emitting pen 3 is directed, the intensity of the light becomes higher compared to other directions. In other words, the variation in intensity of the light along the direction in which the light emitting pen 3 is directed is gentler compared to the other directions, and the closer to the direction in which the light emitting pen 3 is directed, the further the light reaches without attenuation. It should be noted that FIG. 3 shows an example of the intensity distribution of the light in a contour manner assuming that the maximum value is 255.

The detection section 131 detects a plurality of positions (e.g., positions P1, P1') where the light has a predetermined intensity (e.g., 50) as the candidate light points, and then calculates the distance between the reference light point and each of the candidate light points. Then, the detection section 131 detects the candidate light point P1, which is located the furthest from the reference light point, as the extracted light point, and the direction from the reference light point toward the extracted light point as the direction (the pointing direction) of the light emitting pen 3.

As described above, the detection section 131 detects the direction (the pointing direction) of the light emitting pen 3 based on the distance between the light point with the highest light intensity and the light point with the predetermined light intensity.

Figure 4:
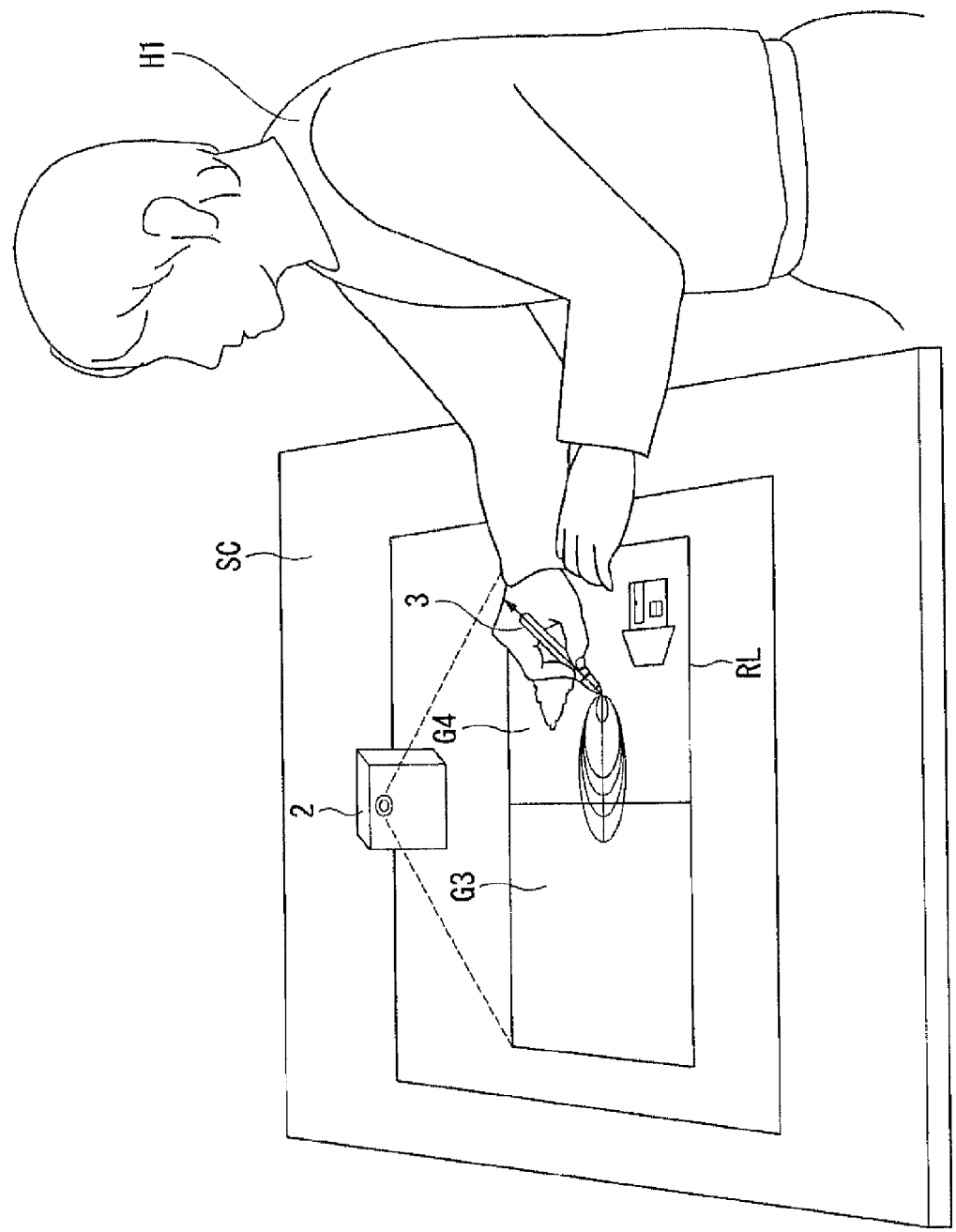
FIG. 4 is an explanatory diagram for explaining an example of an action of a rotation section and a modification section in the image processing section according to the embodiment.

FIG. 4 is an explanatory diagram for explaining an example of an action of the rotation section 134 and the modification section 135 in the image processing section 13 according to the present embodiment.

The projector 2 projects a projection image G3 on the projection surface SC. The user H1 points a part of the projection image G3, and draws an object on the projection image G3 using the light emitting pen 3. Here, the user H1 performs an operation such as pointing or drawing from the right side using the light emitting pen 3 on the projection image G3 before the rotation having been displayed in the entire projection performable area.

On this occasion, the rotation section 134 rotates the input image received by the input section 11 based on the direction (the pointing direction) of the light emitting pen 3 detected by the detection section 131. Specifically, the rotation section 134 rotates the projection image G3 so that the pointing direction of the light emitting pen detected by the detection section 131, namely the direction from the user H1 toward the projection image G3 in the case in which the user H1 attempts to operate the projection image G3 with the light emitting pen 3, and the direction from the bottom toward the top of the image coincide with each other.

Then, the modification section 135 shrinks the image so that the long side of the rotated image has the same length as that of the short side of the image to be rotated, and further, the modification section 135 moves the image so that the lower side of the rotated image coincides with the right side of the image to be rotated. As a result, the projection image G4 having been rotated is displayed so that the entire image can visually be recognized by the user H1 with the correct posture, and at a position near to the user H1.

As described above, according to the present embodiment, the image processing device 1 is provided with the detection section 131 for detecting the pointing direction of the pointing body (the light emitting pen 3), and the rotation section 134 for rotating the image based on the pointing direction of the pointing body (the light emitting pen 3) detected by the detection section 131.

Thus, since the image processing device 1 can rotate the image to change the direction to the direction easy for the user to operate the image by detecting the pointing direction of the pointing body (the light emitting pen 3), the convenience of the user in operating the projection image can be enhanced.

Second Embodiment

Hereinafter, a second embodiment of the invention will be explained in detail with reference to the accompanying drawings.

Figure 5:
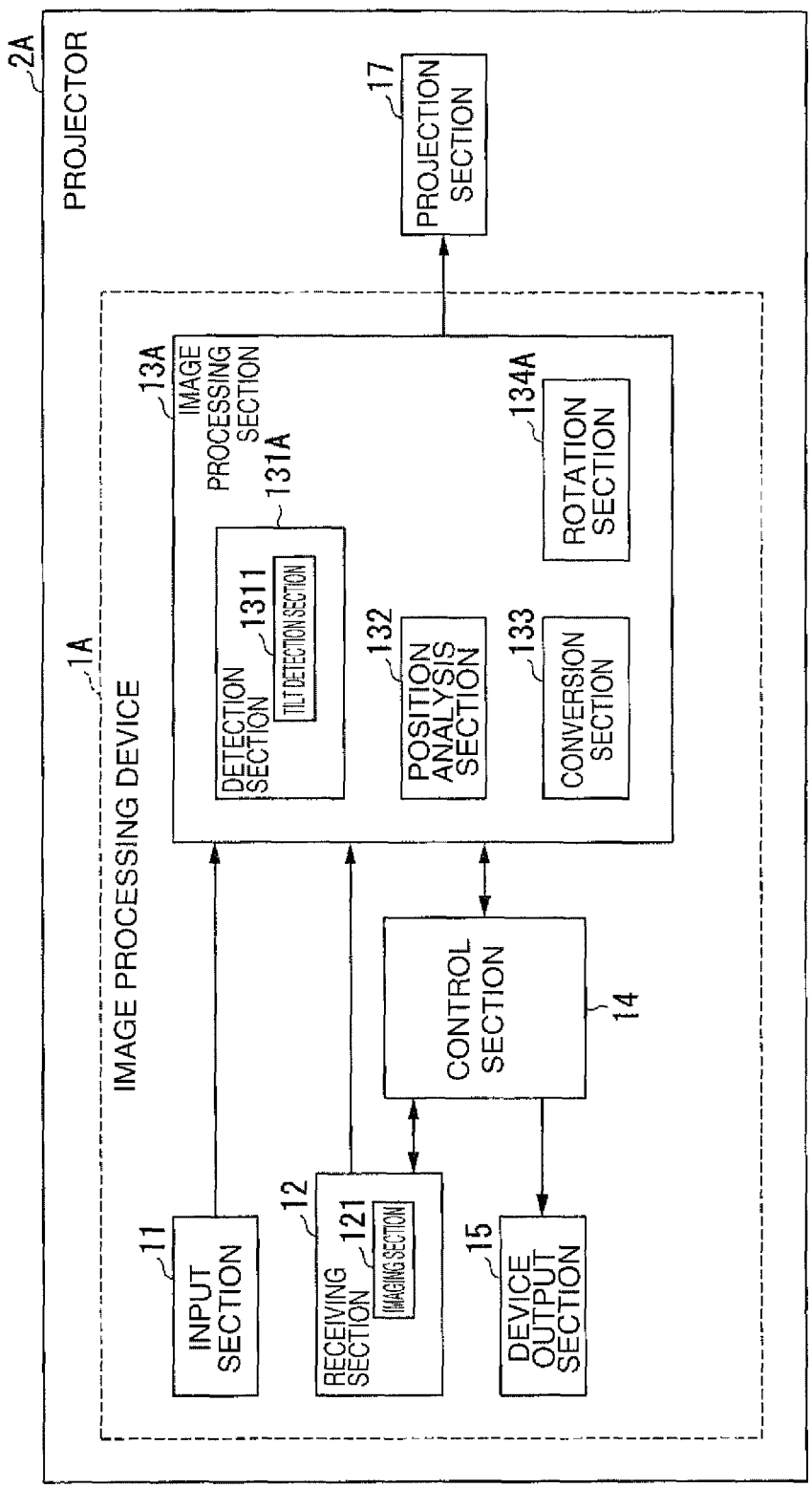
FIG. 5 is a schematic block diagram showing an example of a configuration of a projector provided with an image processing device according to a second embodiment of the invention.

FIG. 5 is a schematic block diagram showing an example of a configuration of a projector 2A provided with an image processing device 1A according to the second embodiment of the invention.

The projector 2A is configured including the image processing device 1A and the projection section 17. The image processing device 1A is configured including the input section 11, the receiving section 12, the image processing section 13, a control section 14, and a device output section 15. The receiving section 12 is configured including an imaging section 121. The image processing section 13 is configured including a detection section 131A, the position analysis section 132, the conversion section 133, and a rotation section 134A. The detection section 131A is configured including a tilt detection section 1311. Although the projector 2A is provided with functions of a typical projector in addition to the above, such functions will be omitted from the drawings and the explanation.

In comparison between the configuration of the projector 2 according to the first embodiment and the configuration of the projector 2A according to the present embodiment, the modification section 135 is eliminated, and the control section 14 and the device output section 15 are added. Further, the action of the detection section 131A and the rotation section 134A is different, and will therefore be explained. Since the other constituents are substantially the same, the explanation thereof will be omitted.

The control section 14 is provided with a CPU, a RAM used for temporary storage of a variety of data and so on, and a nonvolatile memory (anyone not shown) such as a mask ROM, a flash memory, or an FeRAM. The CPU operates with a control program stored in the nonvolatile memory, and thus the control section 14 controls the receiving section 12, the image processing section 13A, and the device output section 15. Further, the control section 14 outputs an instruction signal, which is input from the image processing section 13A, to the device output section 15.

The device output section 15 outputs the instruction signal, which is input from the control section 14, to an external device (e.g., a personal computer) also as the supply source of the input image.

The external device (not shown) outputs an image signal, which is obtained by rotating the image input to the input section 11, to the input section 11.

The detection section 131A detects the direction of the light emitting pen 3 based on the image information input from the imaging section 121. Specifically, the detection section 131 detects the position included in the image information, where the intensity of the light is the highest when the light emitting pen 3 emits the light, as the reference light point.

The light emitting pen 3 is provided with a sensor (e.g., a gyro sensor) for detecting the tilt. The light emitting pen 3 detects the tilt of the light emitting pen 3 using the sensor, and then transmits the tilt information representing the tilt of the light emitting pen 3 thus detected to the projector 2A. It should be noted that as the method of the light emitting pen 3 for transmitting the tilt information, there can be cited, for example, a method of transmitting the tilt information by the type of a light emitting pattern (a blinking pattern).

The tilt detection section 1311 derives the direction (the pointing direction) of the light emitting pen 3 based on the tilt information input from the receiving section 12.

The rotation section 134A generates the instruction signal for rotating a partial area (e.g., a window and a figure) in the projection image indicated by the reference light point based on the position information of the reference light point detected by the detection section 131A and the pointing direction of the light emitting pen 3 detected by the tilt detection section 1311. Specifically, in the case in which, for example, the reference light point indicates a part of a window in the projection image, the rotation section 134A generates the instruction signal for rotating the window so that the pointing direction of the light emitting pen 3, namely the direction from the user toward the projection image in the case in which the user operates the projection image with the light emitting pen 3, and the direction from the bottom toward the top of the window coincide with each other, and then outputs the instruction signal thus generated to the control section 14.

Figure 6:
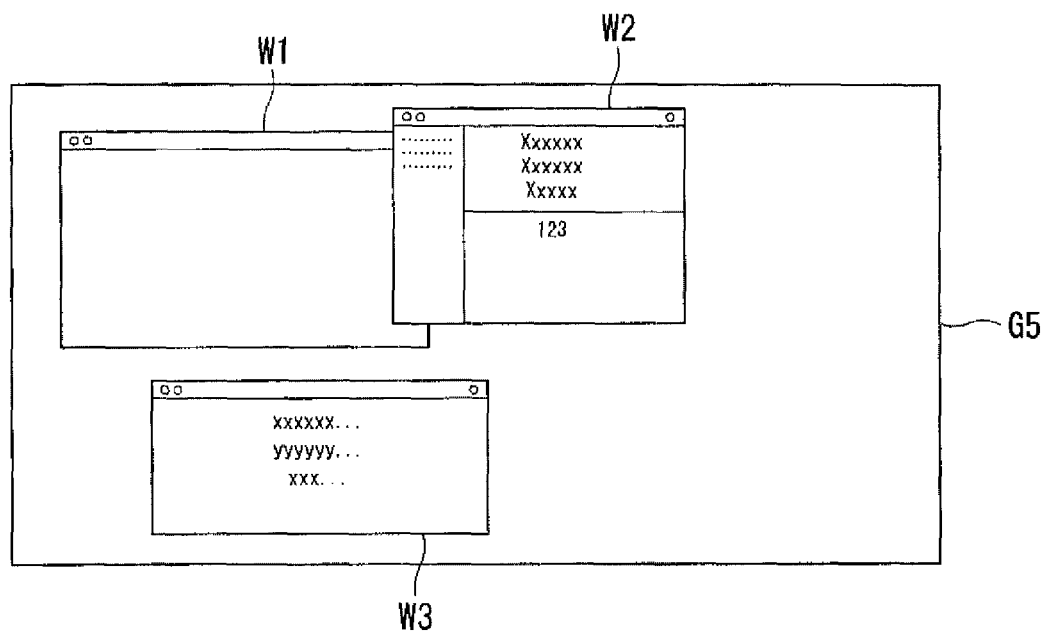
FIG. 6 is an explanatory diagram for explaining an example of a projection image projected by the projector according to the embodiment.

FIG. 6 is an explanatory diagram for showing an example of a projection image projected by the projector 2 according to the present embodiment.

Figure 7:
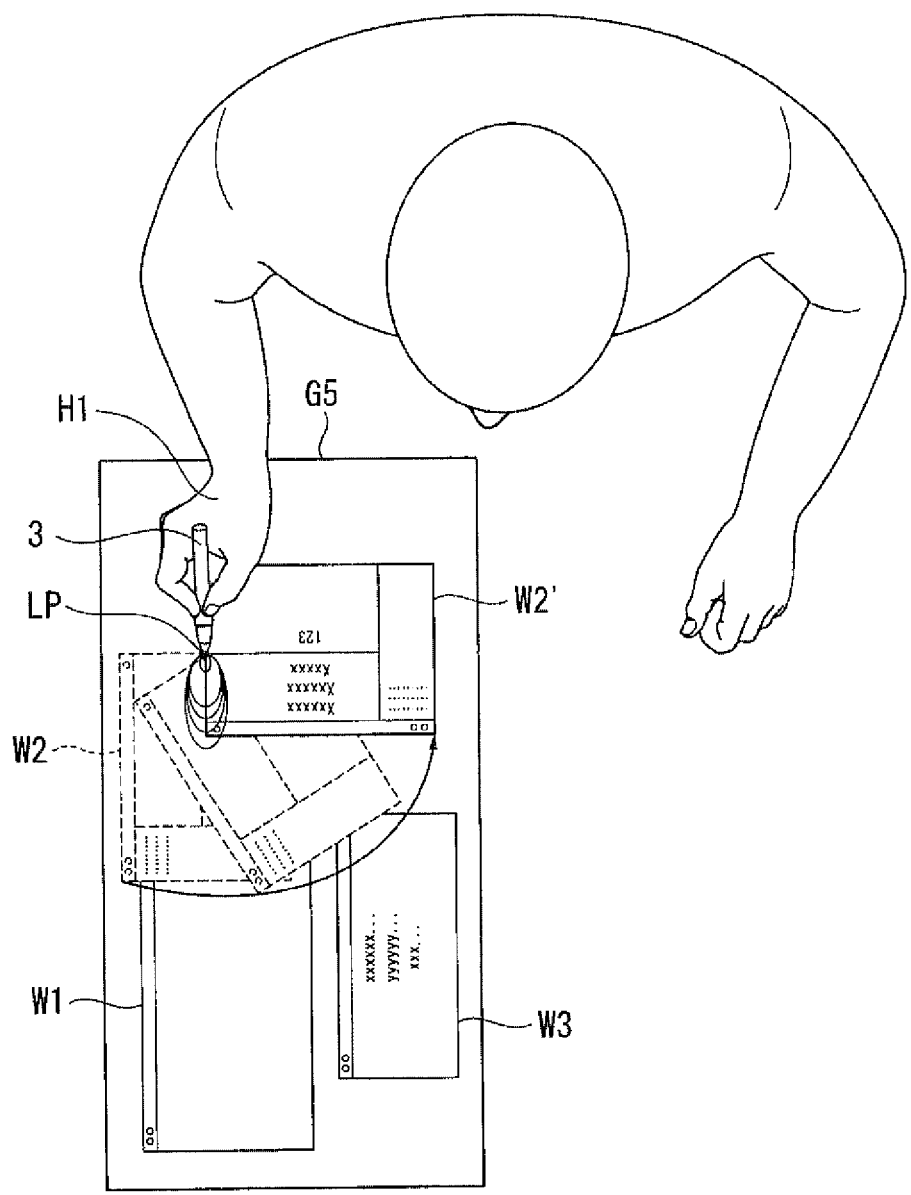
FIG. 7 is an explanatory diagram for explaining an example of a rotating process of a rotation section of the image processing device according to the embodiment.

FIG. 7 is an explanatory diagram for explaining an example of a rotating process of the rotation section 134A of the image processing device 1A according to the present embodiment.

An input image G5 received by the input section 11 shown in FIGS. 6 and 7 includes a plurality of windows W1, W2, and W3. When the user H1 points a part of the window W2 using the light emitting pen 3 with respect to the input image G5, the rotation section 134A outputs the instruction signal for rotating the window W2 so that the pointing direction of the light emitting pen 3, namely the direction from the user toward the projection image in the case in which the user H1 operates the light emitting pen 3, and the direction from the bottom toward the top of the window W2 coincide with each other to the control section 14 based on the position information of the reference light point of the light emitted by the light emitting pen 3 and the pointing direction of the light emitting pen 3.

When the control section 14 outputs the instruction signal to the device output section 15, and then the device output section 15 outputs the instruction signal to the external device, the external device performs the process of rotating the window W2 based on the instruction signal, and then outputs the image signal on which the process has been performed to the input section 11 of the projector 2A.

Thus, as shown in FIG. 7, the window W2 pointed by the light emitting pen 3 can be rotated alone. It should be noted that the rotational center in the case in which the rotation section 134A rotates a part (the window W2) of the image is not particularly limited, and the part (the window W2) of the image can also be rotated centered on, for example, the reference light point as shown in the drawing.

As described above, according to the present embodiment, the image processing device 1A is provided with the detection section 131A for detecting the pointing direction of the pointing body (the light emitting pen 3), and the rotation section 134A for rotating the image based on the pointing direction of the pointing body (the light emitting pen 3) detected by the detection section 131A.

Thus, since the image processing device 1A can rotate the image to change the direction to the direction easy for the user to operate the image by detecting the pointing direction of the pointing body (the light emitting pen 3), the convenience of the user in operating the projection image can be enhanced.

It should be noted that in each of the embodiments described above, it is also possible that the appearance of the pointing body (the light emitting pen 3) is shot by the imaging section 121 capable of shooting visible light, and then the tilt of the pointing body is derived from the shot image. Further, it is also possible to dispose a plurality of pressing switches on the tip portion of the light emitting pen 3, and detect the tilt of the pointing body in accordance with which one of the switches has been pressed. Further, the detection sections 131, 131A can also detect the direction of the light emitting pen 3 or the tilt of the light emitting pen 3 when a predetermined time has elapsed after the user stops operating the light emitting pen 3. Further, the rotation sections 134, 134A can also rotate the image in accordance with the direction of the light emitting pen 3 at a rotational angle of the image determined in advance by, for example, 90 degrees, 45 degrees, or 15 degrees.

Further, although in the first embodiment, it is assumed that the rotation section 134 of the image processing device 1 rotates the image, it is also possible to adopt the configuration in which the instruction signal is output to the external device, the image is rotated in the external device, and then the input section 11 receives the input of the rotated image similarly to the second embodiment. Further, although in the second embodiment, it is explained that the rotation section 134A of the image processing device 1A outputs the instruction signal for rotating the image to thereby rotate the image, it is also possible for the rotation section 134A of the image processing device 1A to rotate the image similarly to the first embodiment.

It should be noted that it can also be arranged that a part or the whole of the image processing devices 1, 1A and the projectors 2, 2A in each of the embodiments described above is realized using a computer. In this case, it is also possible to realize the control function by storing a program for realizing the control function in a computer-readable storage medium, and then making the computer system retrieve and then execute the program stored in the storage medium.

It should be noted that the "computer system" mentioned here corresponds to a computer system incorporated in the image processing devices 1, 1A or the projectors 2, 2A, and should include an OS and hardware such as peripheral devices. Further, the "computer-readable storage medium" denotes a portable medium such as a flexible disk, a magneto-optical disk, a ROM, or a CD-ROM, and a storage device such as a hard disk incorporated in the computer system. Further, the "computer-readable storage medium" can include those dynamically holding a program for a short period of time such as a communication line in the case of transmitting the program via a communication line such as a telephone line or a network such as the Internet, and those holding a program for a certain period of time such as a volatile memory in a computer system to be a server or a client in such a case. Further, the program described above can be one for partially realizing the functions described above, or one realizing the functions described above in combination with a program having already been stored in the computer system.

Further, it is also possible to realize a part or the whole of the image processing devices 1, 1A or the projectors 2, 2A in each of the embodiments described above as an integrated circuit such as an LSI (Large Scale Integration). Each of the functional blocks of the image processing devices 1, 1A or the projectors 2, 2A can individually be realized as a processor, or can partially or totally be integrated as a processor. Further, the method of the circuit integration is not limited to LSI, but the circuit can be realized by a dedicated circuit or a general-purpose processor. Further, in the case in which a technology of the circuit integration replacing the LSI appears due to the advance in semiconductor technology, it is also possible to use an integrated circuit derived from such a technology.

Although some embodiments of the invention are hereinabove explained in detail with reference to the accompanying drawings, the specific configuration is not limited to the configuration described above, but a variety of design changes can be made within the scope or the spirit of the invention.

What is claimed is:

1. An image processing device comprising:
   a processor programmed to:
      detect a pointing direction of a pointing body based on an intensity of light emitted from a tip portion of the pointing body in a direction parallel to an axis passing through the tip portion and the other end portion of the pointing body;
      determine a position pointed to by the pointing body based on the intensity of light emitted from the tip portion in the direction parallel to the axis passing through the tip portion and the other end portion of the pointing body; and
      control a projection section to rotate an image or a partial area of the image based on the detected pointing direction of the pointing body and the determined position pointed to by the pointing body.

2. The image processing device according to claim 1, wherein the processor is further programmed to: control the projection section to change a scale size of the image or the partial area of the image when the image or the partial area of the image rotates.

3. The image processing device according to claim 1, wherein the processor is further programmed to: control the projection section to shift a position of the image or the partial area of the image when the image or the partial area of the image rotates.

4. The image processing device according to claim 1, wherein the processor is further programmed to:
   detect a tilt of the pointing body, and
   detect the pointing direction based on the detected tilt of the pointing body.

5. The image processing device according to claim 4, wherein
   the pointing body is a light emitting pen comprising a plurality of pressing switches on the tip portion of the light emitting pen, and
   the processor is further configured to detect the tilt of the pointing body in accordance with which one of the plurality of pressing switches has been pressed.

6. The image processing device according to claim 1, wherein the processor is further programmed to: output an instruction signal of rotating the image or the partial area of the image to an external device to make the external device control the projection section to rotate the image or the partial area of the image.

7. The image processing device according to claim 1, wherein the determination of the direction pointed to by the pointed body by the processor includes:
   detecting a position with a highest light intensity of a shot image as a reference light point,
   detecting a plurality of positions having a predetermined light intensity lower than the highest light intensity of the reference light point as candidate light points,
   calculating a distance between the reference light point and each of the candidate light points,
   detecting, from among the candidate light points, the candidate light point having the longest distance from the reference light point as an extracted light point, and
   detecting the direction from the reference light point toward the extracted light point as the pointing direction of the pointing body.

8. The image processing device according to claim 1, wherein the processor is further programmed to: rotate a window alone in the image in accordance with the pointing direction of the pointing body and the position pointed to by the pointing body.

9. The image processing device according to claim 1, wherein the processor is further programmed to: while rotating the image, shrink the image so that the long side of the rotated image has the same length as that of the short side of the image to be rotated, and move the image so that the lower side of the rotated image coincides with the right side of the image to be rotated.

10. A projector comprising:
    a processor programmed to:
       receive an input image;
       control a projection section to project the received input image;
       detect a pointing direction of a pointing body based on an intensity of light emitted from a tip portion of the pointing body in a direction parallel to an axis passing through the tip portion and the other end portion of the pointing body;
       determine a position pointed to by the pointing body based on the intensity of light emitted from the tip portion in the direction parallel to the axis passing through the tip portion and the other end portion of the pointing body; and
       control the projection section to rotate the received input image or a partial area of the received input image based on the detected pointing direction of the pointing body and the determined position pointed to by the pointing body.

11. The projector according to claim 10, wherein the projection section includes: a discharge lamp, a liquid crystal panel, a spectroscopic element, a polarization element, or a projection lens.

12. An image processing method comprising:
    detecting, by a processor, a pointing direction of a pointing body based on an intensity of light emitted from a tip portion of the pointing body in a direction parallel to an axis passing through the tip portion and the other end portion of the pointing body;
    determining, by the processor, a position pointed to by the pointing body based on the intensity of light emitted from the tip portion in the direction parallel to the axis passing through the tip portion and the other end portion of the pointing body; and
    controlling, by the processor, a projection section to rotate an image or a partial area of the image based on the detected pointing direction of the pointing body and the determined position pointed to by the pointing body.

* * * * *